(12) United States Patent
George-Svahn

(10) Patent No.: US 10,599,214 B2
(45) Date of Patent: Mar. 24, 2020

(54) SYSTEMS AND METHODS FOR GAZE INPUT BASED DISMISSAL OF INFORMATION ON A DISPLAY

(71) Applicant: Tobii AB, Danderyd (SE)

(72) Inventor: Erland George-Svahn, Stockholm (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 14/919,437

(22) Filed: Oct. 21, 2015

(65) Prior Publication Data
US 2016/0109946 A1    Apr. 21, 2016

Related U.S. Application Data

(60) Provisional application No. 62/066,641, filed on Oct. 21, 2014.

(51) Int. Cl.
*G06F 3/01* (2006.01)
*G06F 3/0484* (2013.01)

(52) U.S. Cl.
CPC .......... *G06F 3/013* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 6,078,310 A * | 6/2000 | Tognazzini | ............ | G06F 3/013 345/158 |
| 8,957,847 B1 * | 2/2015 | Karakotsios | ............ | G06F 3/013 345/156 |
| 2006/0256083 A1 * | 11/2006 | Rosenberg | ............ | G06F 3/013 345/156 |
| 2012/0105486 A1 * | 5/2012 | Lankford | ............ | G06F 3/013 345/661 |
| 2015/0113454 A1 * | 4/2015 | McLaughlin | ............ | G06F 3/013 715/765 |
| 2015/0227195 A1 * | 8/2015 | McKenna | ............ | G06F 3/013 345/156 |
| 2016/0077584 A1 * | 3/2016 | Xiang | ............ | G06F 3/013 345/156 |

* cited by examiner

*Primary Examiner* — Amare Mengistu
*Assistant Examiner* — Sarvesh J Nadkarni
(74) *Attorney, Agent, or Firm* — Samuel I. Yamron

(57) ABSTRACT

According to the invention, a method for dismissing information from a display device based on a gaze input is disclosed. The method may include determining that an object has been displayed on a display device. The method may also include determining an area on the display device associated with the object. The method may further include determining a gaze location of a user on the display device. The method may additionally include causing the object to not be displayed on the display device, based at least in part on the gaze location being located within the area for at least a first predetermined length of time.

22 Claims, 4 Drawing Sheets

SYSTEMS AND METHODS FOR GAZE INPUT BASED DISMISSAL OF INFORMATION ON A DISPLAY

CROSS-REFERENCE TO RELATED APPLICATIONS

This application claims priority to Provisional U.S. Patent Application No. 62/066,641 filed Oct. 21, 2014, entitled "GAZE BASED DISMISSAL OF INFORMATION," entire disclosure of which is hereby incorporated by reference, for all purposes, as if fully set forth herein.

BACKGROUND OF THE INVENTION

Systems and methods for interacting with computing devices are diverse. Over time the ways in which people interact with computing devices has changed, from simple touch based interaction such as keyboard and mouse, to gesture based vision systems.

Fundamentally, human-computer interaction remains the same however. Information is shown on a display and the user enacts an interaction to manipulate the information. This can range from controlling a computer game, to creating a text document, to simply reading information. However, the steps of the interaction remain the same: (1) show information, (2) perform an interaction based on the information, and (3) change the displayed information.

This presents a problem that an interaction is required even for the most mundane of tasks. Take for example a notification on the main screen of an operating system, perhaps a displayed notification of a new message, email, or the like. Currently there are two ways to interact with such a notification, either performing an interaction such as a mouse click to remove the notification, or the notification may disappear after a pre-determined period of time.

Both these methods present problems. Firstly, performing an interaction requires effort and may distract from whatever task the user is currently performing. Secondly, dismissing the notification after a predetermined period of time provides no guarantee that the user actually saw and understood the notification. Thus, the notification may disappear without the user having read it.

Therefore, there exist problems with existing systems which would be ameliorated or overcome by a solution that provides a convenient way of acknowledging information as being seen, without significantly impacting a user's current task.

Further, in present systems there are sometimes enhanced or magnified views of information on the display (often referred to as magnified windows). These enhanced views may obscure other information on the display, and as such are only suitable as temporarily displayed items. Requiring that a user click elsewhere or somehow otherwise physically interact is a common way to dismiss a magnified window. This however requires a physical step from the user and if the user's intended next task is in the area of the screen upon which the magnified window was placed, performing a physical step elsewhere may be counter-intuitive.

Therefore, there exist problems with dismissing magnified windows and other displayed objects in conventional systems. Embodiments of the present invention provide solutions to these and other problems.

BRIEF DESCRIPTION OF THE INVENTION

In one embodiment, a method for dismissing information from a display device based on a gaze input is provided. The method may include determining that an object has been displayed on a display device. The method may also include determining an area on the display device associated with the object. The method may further include determining a gaze location of a user on the display device. The method may additionally include causing the object to not be displayed on the display device, based at least in part on the gaze location being located within the area for at least a first predetermined length of time.

In another embodiment, a system for dismissing information from a display device based on a gaze input is provided. The system may include a display device, an eye tracking device, and one or more processors. The one or more processors may be configured to determine that an object has been displayed on the display device. The one or more processors may also be configured to determine an area on the display device associated with the object. The one or more processors may further be configured to determine, with the eye tracking device, a gaze location of a user on the display device. The one or more processors may additionally be configured to cause the object to not be displayed on the display device, based at least in part on the gaze location being located within the area for at least a first predetermined length of time.

In another embodiment, a non-transitory machine readable medium having instructions stored thereon for dismissing information from a display device based on a gaze input is provided. The instructions may be executable by one or more processors to determine that an object has been displayed on a display device. The instructions may also be executable to determine an area on the display device associated with the object. The instructions may further be executable to determine a gaze location of a user on the display device. The instructions may additionally be executable to cause the object to not be displayed on the display device, based at least in part on the gaze location being located within the area for at least a first predetermined length of time.

BRIEF DESCRIPTION OF THE DRAWINGS

The present invention is described in conjunction with the appended figures.

Figure 1:
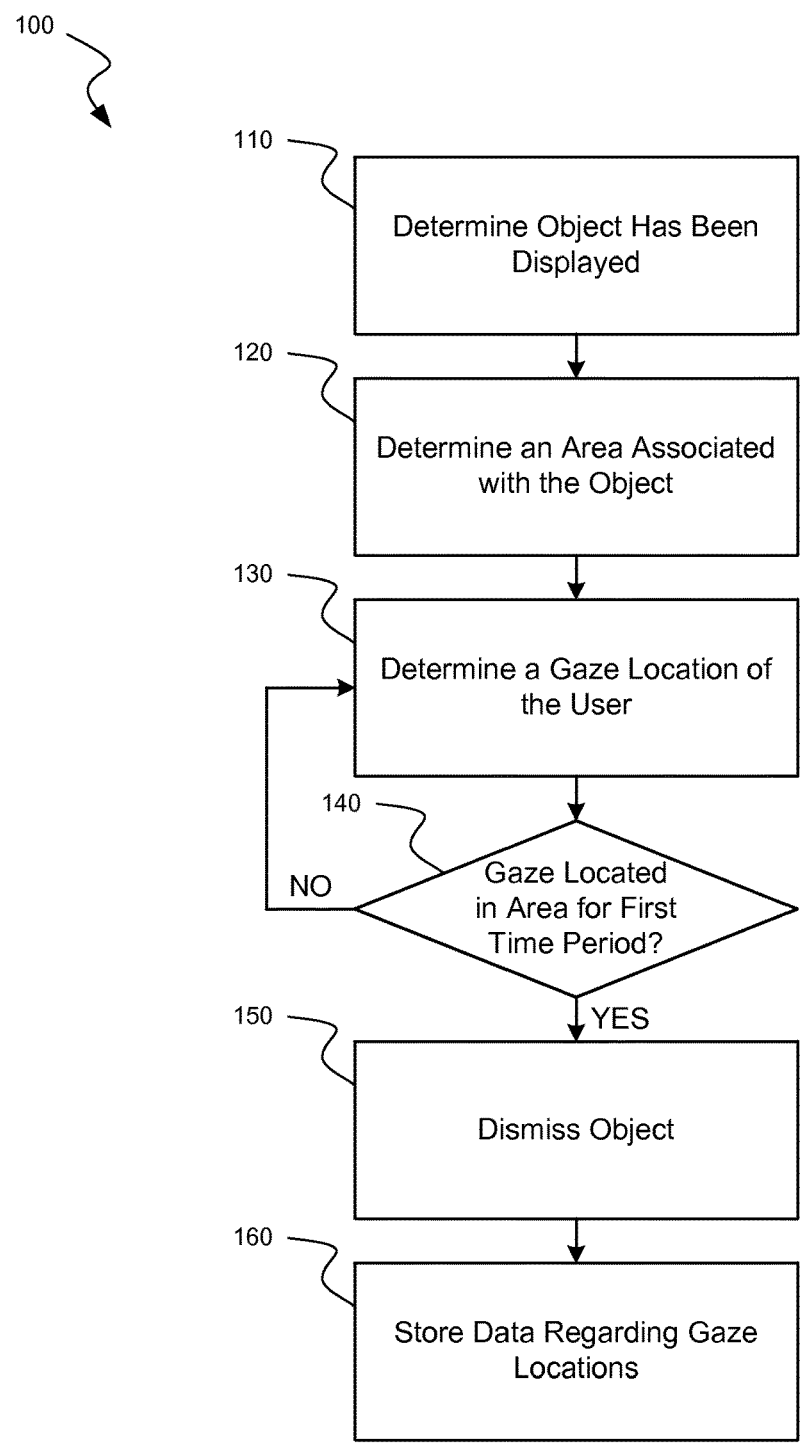
FIG. 1 is a block diagram of one possible method of the invention for dismissing information from a display device based upon the user gazing at the information for a first period of time.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to, transitory and non-transitory, portable or fixed storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In one embodiment of the invention, a method for dismissing information from a display device based on a gaze input is provided. Systems for conducting such methods may also be provided. Likewise, non-transitory machine readable mediums may be provided, which, when executed by one or more processors, conduct such methods. These methods may be useful when a user is operating a computing device which has an eye tracking device equipped so that a user's gaze may be monitored and used as an input to the computing device, in a parallel manner to traditional input devices such as keyboards, mice, touchpads, touchscreens, etc.

The eye tracking device may employ eye tracking technology to determine a gaze direction or gaze point of a user, potentially on the display device. The most common form of eye tracking technology uses at least one image sensor and at least one infrared emitter. The image sensor captures images of at least one eye comprising a reflection of light from the infrared emitter. A processing unit may then process captured images to determine characteristics of the reflection and from these characteristics determine a gaze direction of a user. It is understood that a person of normal skill in the art may understand that any form of eye tracking technology is suitable for use with embodiments of the present invention.

Dismissing information from a display device may be useful when certain information is only relevant to the user for a limited amount of time. Because display devices have a limited amount of display surface area, it may be helpful to dismiss such information from the display in an efficient manner so that the display surface area can be used for other tasks. Additionally, dismissal of the information in an unobtrusive manner may assist the user in maintaining efficiency on their primary task for which the display device is being used. For example, if a user of a computing device is drafting an important document, and an e-mail message arrives, causing a notification of such to appear, it may be important for the user to be able to quickly read the notification, and then for the user to return to drafting the document with as minimal an interruption as possible.

Other types of information which may be only temporarily important or useful to a user, beyond e-mail notifications, may include, merely by example, system notifications, application notifications, alarms, advertisements, zoom windows of information in a main display, etc. Embodiments of the invention allow a user to glance at such information and have it dismissed based on their gaze lying on the information for at least some period of time. In some embodiments, dismissal may be further conditioned on the user's gaze being located away from the information for some period of time thereafter.

In one embodiment, the method may include determining that an object, for example a notification, has been displayed on a display device. Depending on the embodiment, this may occur in a number of ways. In some embodiments, a software program running on the computing device which causes notifications to be displayed by informs gaze detection and monitoring software that an object is being displayed for which gaze-based dismissal should be available. In other embodiments, the gaze detection and monitoring software may continually monitor what is being displayed by other software programs and detect when such an object has been displayed. In yet other embodiments, an independent software program to the notification initiating software and the gaze detection and monitoring software may determine that such an object is being displayed.

In any of the above or other embodiments, various objects displayed on a computing device may have a flag value associated with them that indicates whether gaze-based dismissal is, or is not, available for that object. Such a flag may be dynamic depending on any number of circumstances. For example, an object may be flagged for potential gaze-based dismissal when it takes up only a small portion of the display device (e.g., the object is a small window on the display), but be flagged differently upon a change in the object (e.g., when the object is maximized to full screen size). In some embodiments, users may be able to configure which objects may be subject to gaze-based dismissal. In some embodiments, objects that are subject to gaze-based dismissal may be visually indicated as such in some manner, thereby alerting the user to the potential for gaze-based dismissal (e.g., highlighted or denoted by a graphical or textual indicator).

The method may also include determining an area on the display device associated with an object for which gaze-based dismissal is possible. In some embodiments, the area associated with the object may be the same area of the display device which displays the object (i.e., the bounds of the object). However, in other embodiments the area associated with the object may be the area of the display device which displays the object and some additional area around the object. In some embodiments, the amount of additional area around the object may be constant (e.g., an additional predefined number of pixels or distance around the object). In some embodiments, the user may be able to select exact-area association, or extra-area association for different types of objects. The user may also be able to select the amount of extra-area associated with objects.

In some embodiments, the amount of additional area around the object may be dependent on the object. For example, the extra area may be an additional predefined number of pixels or distance around the object based on the size of the object. For example, a larger area around the object may be used when the object is small, and a smaller area around the object may be used when the object is larger. Finally, different types of objects may have preset extra areas associated with their display. For example, objects flagged as important may have less extra area associated with their presentation, while less important objects may have more extra area associated with their presentation.

The method may further include determining a gaze location of a user on the display device. As discussed above, an eye tracking device may be used to ascertain this information. The method may then cause the object to not be displayed on the display device (i.e., remove the object from the display device), based at least in part on the gaze location being located within the area for at least a first predetermined length of time. The first predetermined length of time may depend upon attributes of the object and/or other factors. For example, primarily image objects may be associated with shorter first predetermined lengths of time, while primarily textual objects may be associated with longer first predetermined lengths of time, in order to give the user more time to read the object. In some embodiments, the amount of text in the object may adjust the first predetermined amount of time.

In other embodiments, different objects may have preset time periods associated with them, thereby allowing the object's programmer/creator to set the amount of time believed necessary for a user to register the information provided by the object. For example, e-mail notifications which display the first 50 characters of an e-mail may have one set time period associated therewith, while calendar reminders or other alarms may have a second set time period associated therewith. In some embodiments, users may be able to configure the first amount of time to their preference, including setting different times for different types of objects or for objects with certain attributes.

In some embodiments the object may include a text string, where a text string may encompass readable text and/or any other human readable information. In addition or in lieu of the user being required to gaze at the area associated with the object for a first predetermined length of time, the method may also require that the user's gaze location move across the text string in a manner representative of the user reading the text string. A manner representative of the user reading the text string may include patterns of gaze location movement which have previously been identified in testing/analysis as indicating a user is reading information such as a text string. Such patterns can instead or also include left-to-right movement of the gaze location (or right-to-left movement for some languages), movement from one word to the next, movement from top to bottom of the gaze location (or bottom-to-top movement for some languages), and/or some cadenced movement of the gaze location previously identified in testing/analysis as indicating a user is reading information such as a text string. Other pattern identification methodologies may be employed depending on the embodiment.

In some embodiments, in addition to the user having to have gazed upon the area associated with the object for a first predetermined amount of time, the method may also require the user's gaze to leave the area for at least a second predetermined length of time thereafter. If the user's gaze returns to the area before the second predetermined length of time has elapsed, the first predetermined period of time may be reset (or not), and a look-away for the second predetermined period of time must occur in full (or in part, as remaining from the first look-away), before the object is dismissed.

As above with regard to the first predetermined length of time, the second predetermined length of time may be dependent on the object or the user's preferences. Additionally, objects subject to such a look-away requirement for gaze-based dismissal may be visually indicated as such in some manner, thereby alerting the user to the potential for this type of gaze-based dismissal. The visual indication may be the same or different than that used for objects which do not have a look-away requirement.

In some embodiments, the first predetermined length of time and/or the second predetermined length of time may be either static or dynamic. For example, in one embodiment both the first time period and the second timer period may each be set to 3 seconds, and remain static. However, in a dynamic embodiment, software may monitor how long a user glances at objects and learn that shorter time periods are necessary for such user. For example, a user may typically look at e-mail notifications for only 1.3 to 1.8 seconds before moving their gaze back to other areas of the display. In this example, a dynamic embodiment might adjust the first time period to 2 seconds, increasing the speed at which the method returns display device screen area to the user's other tasks, and limiting the interruption of the notification Likewise, some action performed by the user prior to first gazing upon the object may alter a dynamic first time period (and/or second time period). For example, if the user has been using a particular application for an extended period of time, the first time period may be set shorter than if the user has been interacting with many different applications just prior to the object being presented. In this manner, the method may minimize disruption when the user is likely engrossed with a particular task, and allow for more disruption when the user is likely not particularly engrossed with any one task.

In some embodiment, the second time period may be dynamic based on the amount of time the user's gaze was upon the area associated with the object. For example, if a user gazes upon an object for just longer than the first predetermined length of time then looks away, the second predetermined length of time may be set to longer than if the user had gazed upon the object for well longer than the first predetermined length of time. This would anticipate situations where the user is likely to want to look back at the object prior to dismissal.

In some embodiments, data regarding the user's gaze interaction with the areas associated with the objects subject to gaze based dismissal may be stored for later use and analysis of the user's gaze habits. Data about the user's gaze during and after the first predetermined length of time, and the second predetermined length of time, may be included (including when the user looks away prior to the first time period ending). Such data may include the duration of the user's gaze upon any particular area or point within the area, and the particular area or point upon which the user gazed. This may be useful in assisting the programmers/creators of such objects in making objects more interesting/useful to users. For example, advertisers may use such information to hone advertisement campaigns based on user gaze response.

Turning now to FIG. 1, a block diagram of one possible method 100 of the invention for dismissing information from a display device based upon the user gazing at the information for a first period of time is shown.

At block 110, a processor and/or other device determines that an object has been displayed. This may occur in any of the manners described above, or in some other manner. At block 120, the processor and/or other device determines an area on the display device associated with the object. The area may be solely the area on the display device taken up by the object, or may be a somewhat greater area as described above.

At block 130, the gaze point of the user may be determined by the processor, eye tracking device, and/or other device. At block 140, the processor and/or other device determines whether the user's gaze has remained in the first area for a first predetermined length of time. If not, the gaze of the user is continued to be monitored at block 130. However, if user's gaze has remained in the area for at least the first time period, the object is dismissed at block 150. At block 160, data regarding the user's gaze location during the sequence of events may be stored for later analysis.

Figure 2:
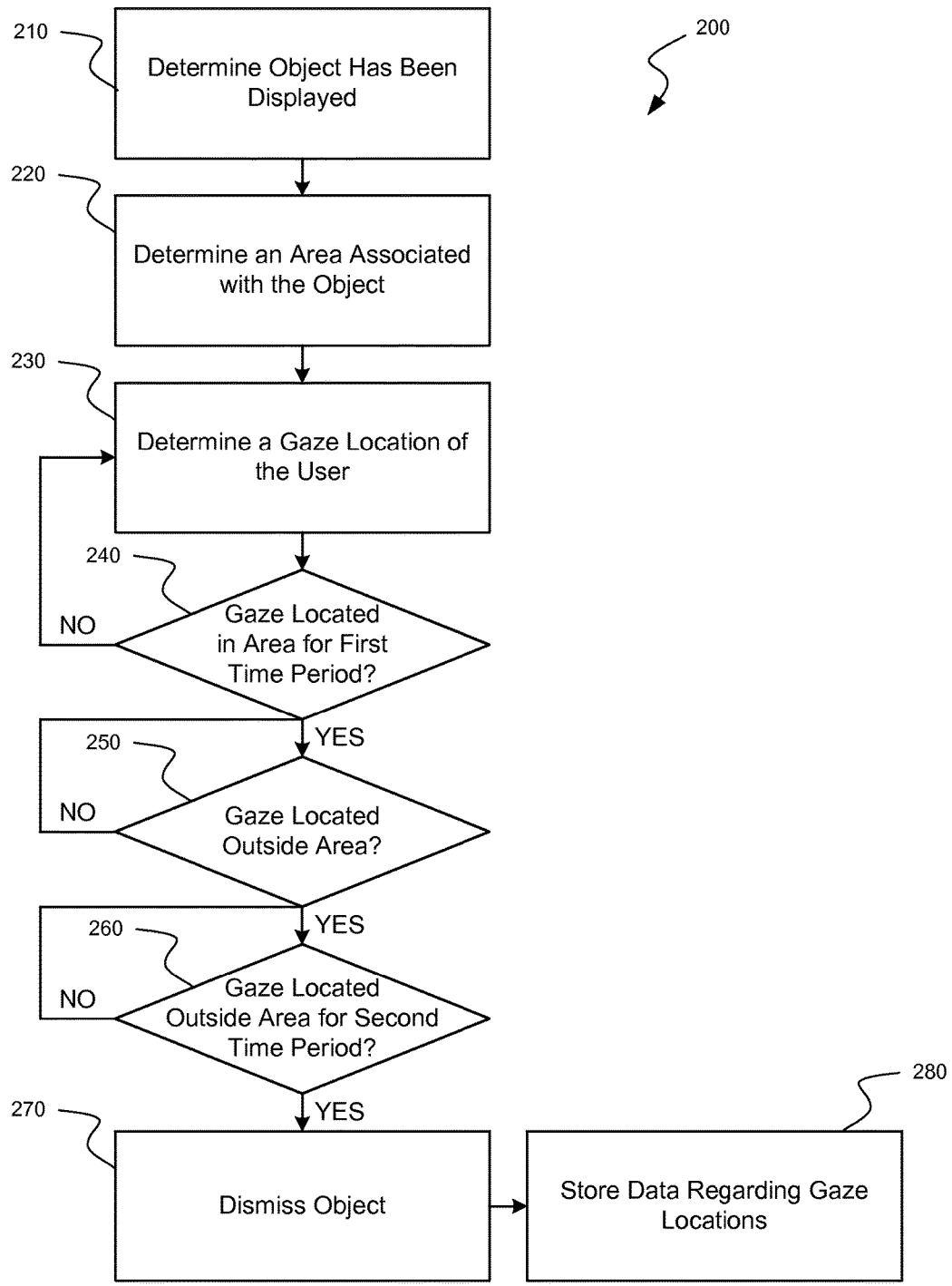
FIG. 2 is a block diagram of another possible method of the invention for dismissing information from a display device based upon the user gazing at the information for a first period of time, and then looking away for a second period of time.

FIG. 2 shows a block diagram of another possible method 200 of the invention for dismissing information from a display device based upon the user gazing at the information for a first period of time, and then looking away for a second period of time.

At block 210, a processor and/or other device determines that an object has been displayed. This may occur in any of the manners described above, or in some other manner. At block 220, the processor and/or other device determines an area on the display device associated with the object. The area may be solely the area on the display device taken up by the object, or may be a somewhat greater area as described above.

At block 230, the gaze point of the user may be determined by the processor, eye tracking device, and/or other device. At block 240, the processor and/or other device determines whether the user's gaze has remained in the first area for a first predetermined length of time. If not, the gaze of the user is continued to be monitored at block 230.

However, if user's gaze has remained in the area for at least the first time period, method 200 continues at block 250 where it is determined if the user's gaze has left the area associated with the object. If not, the method continues to wait for the user's gaze to do so.

Upon the user's gaze leaving the area associated with the object, at block 260 it is determined if the user's gaze has remained outside the area for at least the second predetermined length of time. If not, the method continues to wait for the user's gaze to do so.

However, upon the second time period being met by the user's gaze remaining outside the area associated with the object, the object is dismissed at block 270. At block 280, data regarding the user's gaze location during the sequence of events may be stored for later analysis.

Figure 3:
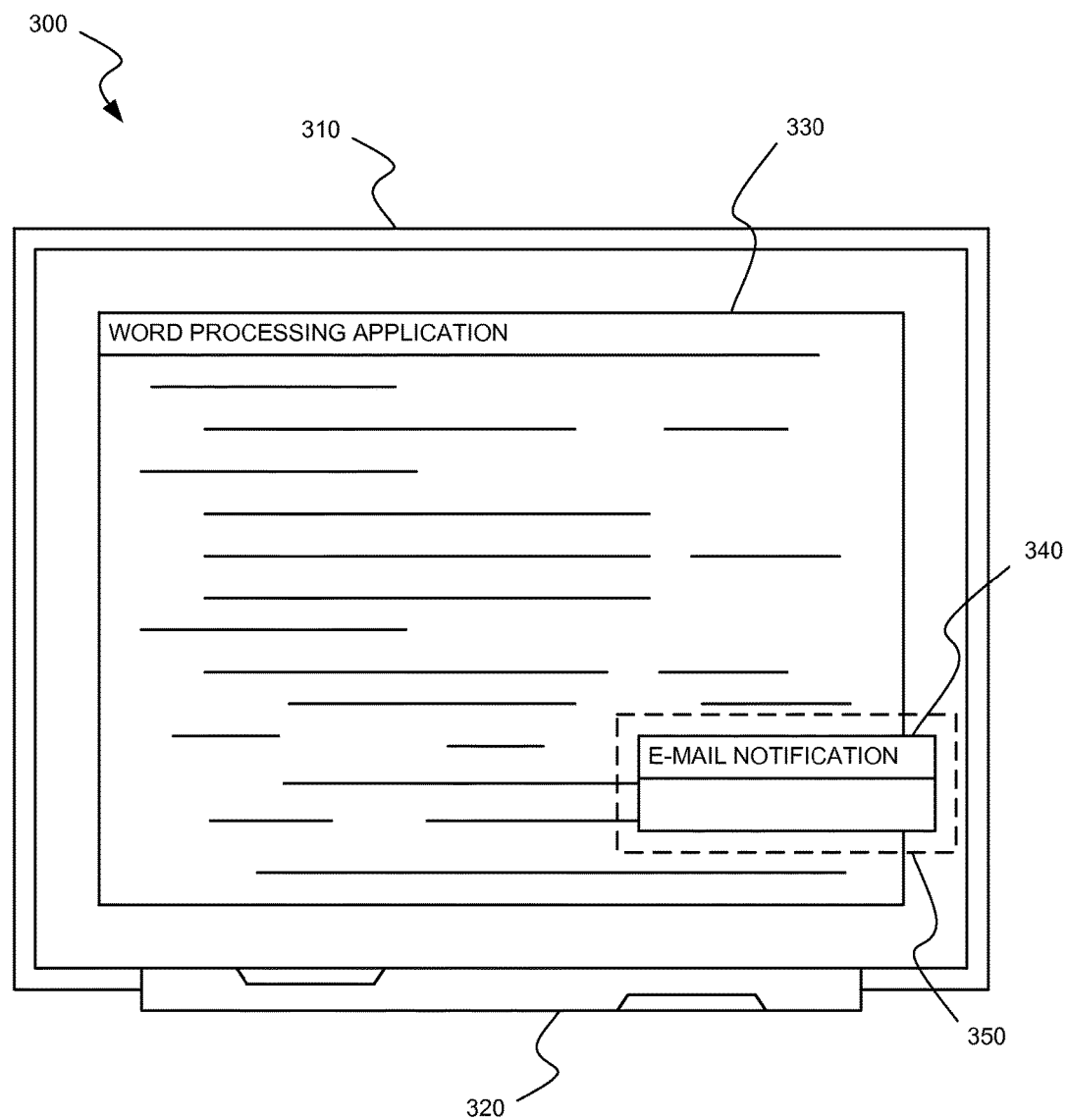
FIG. 3 is a schematic view of a display device and eye tracking device having a primary application and an e-mail notification which may be subject to gaze-based dismissal.

FIG. 3 shows schematic view of a display device 310 and eye tracking device 320 having a primary application (in this example, a word processing application 330) and an e-mail notification 340 which may be subject to gaze-based dismissal. In this example operation of many of the embodiments of the invention, an e-mail notification 340 has appeared during a user's drafting of a document in a word processing application 330. E-mail notification 340 may indicate that a new e-mail has arrived for the user. As can be seen, e-mail notification 340 takes up a portion of display device 310, and may even obscure a portion of word processing application 330, thereby distracting the user, and requiring dismissal if information "underneath" the object is to be re-displayed.

Eye tracking device 320 and a processor of the computing device attached thereto (and also attached to display device 310) may monitor the gaze location of the user on display device 310. Before or simultaneously, the processor or other device may determine that e-mail notification 340 is an object subject to gaze based dismissal, and determine that area 350 is the area that will be associated with the object. In this example, area 350 is somewhat larger than the object, but in other embodiments, the actual size of the object may be employed.

The processor of the computing device may or may not highlight or emphasize the object, perhaps by displaying the determined area 350 associated with the object in some embodiments. Upon the user's gaze lying within area 350 for a first period of time, e-mail notification 340 may be dismissed from the display, for example per method 300. In other embodiments, e-mail notification 340 may be dismissed instead after the user's gaze had lied within area 350 for a first period of time, and then in some area outside area 350 for a second period of time, for example per method 400.

Figure 4:
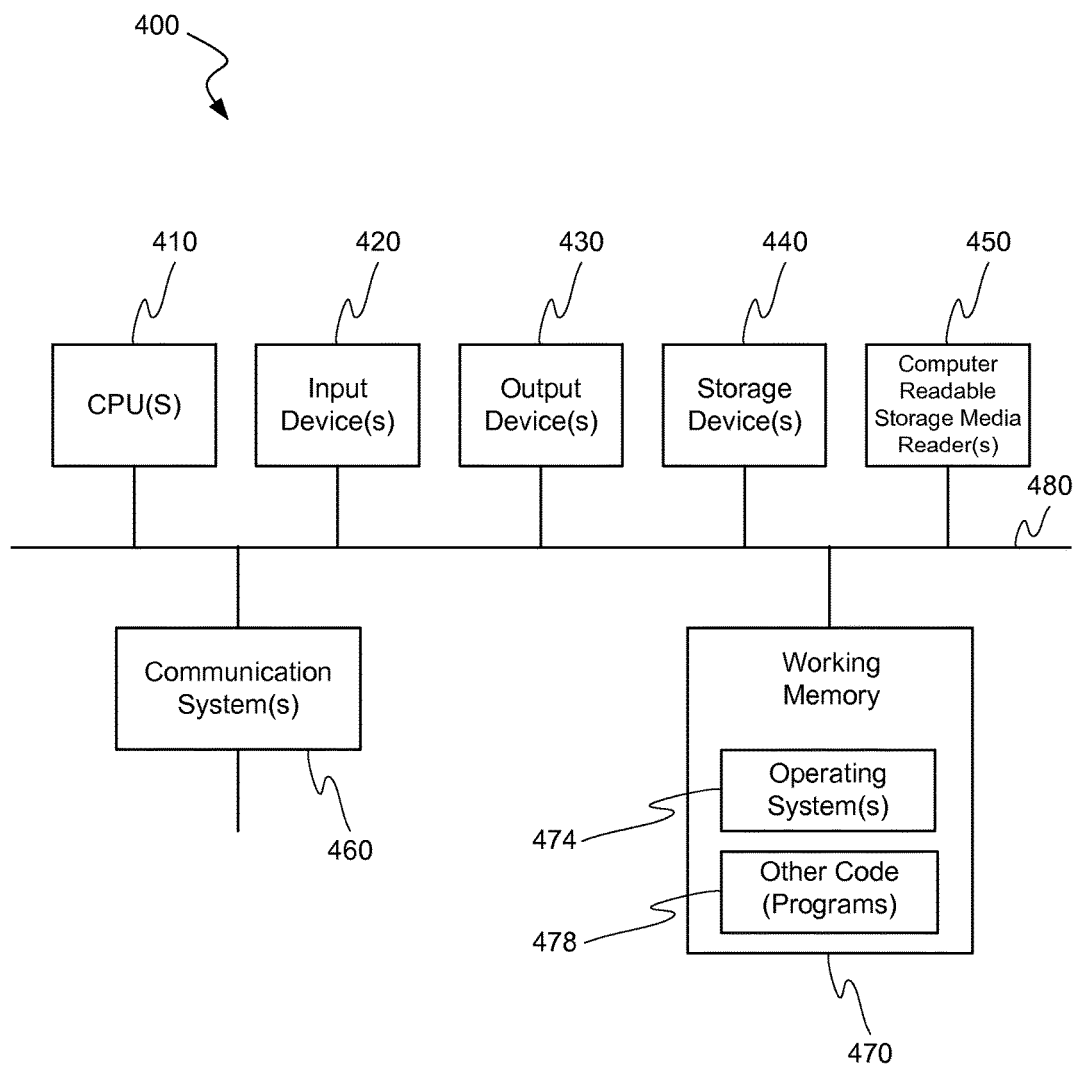
FIG. 4 is a block diagram of an exemplary computer system capable of being used in at least some portion of the apparatuses or systems of the present invention, or implementing at least some portion of the methods of the present invention.

FIG. 4 is a block diagram illustrating an exemplary computer system 400 in which embodiments of the present invention may be implemented. This example illustrates a computer system 400 such as may be used, in whole, in part, or with various modifications, to provide the functions of the computing device, eye tracking device, processors, and/or other components of the invention such as those discussed above. For example, various functions of the computing device may be controlled by the computer system 400, including, merely by way of example, determining the gaze point of the user, determining when to dismiss an object from the display device, etc.

The computer system 400 is shown comprising hardware elements that may be electrically coupled via a bus 490. The hardware elements may include one or more central processing units 410, one or more input devices 420 (e.g., a mouse, a keyboard, eye tracking device, etc.), and one or more output devices 430 (e.g., a display device, a printer, etc.). The computer system 400 may also include one or more storage device 440. By way of example, storage device(s) 440 may be disk drives, optical storage devices, solid-state storage device such as a random access memory ("RAM") and/or a read-only memory ("ROM"), which can be programmable, flash-updateable and/or the like.

The computer system 400 may additionally include a computer-readable storage media reader 450, a communications system 460 (e.g., a modem, a network card (wireless or wired), an infra-red communication device, Bluetooth™ device, cellular communication device, etc.), and working memory 480, which may include RAM and ROM devices as described above. In some embodiments, the computer system 400 may also include a processing acceleration unit 470, which can include a digital signal processor, a special-purpose processor and/or the like.

The computer-readable storage media reader 450 can further be connected to a computer-readable storage medium, together (and, optionally, in combination with storage device(s) 440) comprehensively representing remote, local, fixed, and/or removable storage devices plus storage media for temporarily and/or more permanently containing computer-readable information. The communications system 460 may permit data to be exchanged with a network, system, computer and/or other component described above.

The computer system 400 may also comprise software elements, shown as being currently located within a working memory 480, including an operating system 484 and/or other code 488. It should be appreciated that alternate embodiments of a computer system 400 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 400 may include code 488 for implementing any or all of the function of the various elements of the architecture as described herein. For example, software, stored on and/or executed by a computer system such as system 400, can provide the functions of the computing device, eye tracking device, processors, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A method for dismissing information from a display device based on a gaze input, wherein the method comprises:
    determining that an object comprising a text string has been displayed on a display device by an application, the object indicated as available for dismissal based on a display size of the object on the display device;
    determining an area on the display device associated with the object, the area containing the object;
    determining a gaze location of a user on the area on the display device; and
    causing the object to not be displayed on the display device, based on:
        the gaze location being located within the area for at least a first predetermined length of time, wherein the first predetermined length of time is defined as a first amount of time of gaze within the area based on the text string of the object being displayed on the display device and changes to a second amount of time of gaze within the area when an image is displayed instead of the text string; and
        the gaze location moving across the text string in a manner representative of the user reading the text string when the gaze location is located within the area;
    wherein the object is indicated as available for dismissal by using a flag, wherein a value of the flag is set based on the display size of the object being smaller than a full screen size, and wherein the area includes a display area of the object and an additional area around the display area, and wherein an amount of the additional area is based on the display size of the object.

2. The method for dismissing information from a display device based on a gaze input of claim 1, wherein:
    causing the object to not be displayed on the display device is further based at least in part on the gaze location not being located within the area for at least a second predetermined length of time after the first predetermined length of time.

3. The method for dismissing information from a display device based on a gaze input of claim 2, wherein the second predetermined length of time is a static value.

4. The method for dismissing information from a display device based on a gaze input of claim 2, wherein the second predetermined length of time is a dynamic value.

5. The method for dismissing information from a display device based on a gaze input of claim 4, wherein the dynamic value is selected based on a gaze history of the user.

6. The method for dismissing information from a display device based on a gaze input of claim 4, wherein the dynamic value is selected based on an action of the user preceding the first predetermined length of time.

7. The method for dismissing information from a display device based on a gaze input of claim 4, wherein the dynamic value is selected based on a length of time the gaze location was located within the area during at least some portion of the first predetermined length of time.

8. The method for dismissing information from a display device based on a gaze input of claim 1, wherein the object is selected from a group consisting of:
    a notification;
    an advertisement; and
    a zoom window.

9. The method for dismissing information from a display device based on a gaze input of claim 1, wherein determining the gaze location on the area comprising detecting the gaze location within a first area of the display device which displays the object or a second area around the object.

10. The method for dismissing information from a display device based on a gaze input of claim 1, wherein causing the object to not be displayed comprises:
a dismissal of the object from the display device.

11. The method for dismissing information from a display device based on a gaze input of claim 1, wherein the first predetermined length of time is a static value.

12. The method for dismissing information from a display device based on a gaze input of claim 1, wherein the method further comprises:
storing data about the gaze location during at least the first predetermined length of time.

13. The method for dismissing information from a display device based on a gaze input of claim 12, wherein the data comprises at least one selection from a group consisting of:
a duration of the gaze location at a particular location within the area; and
the particular location of the gaze location.

14. The method for dismissing information from a display device based on a gaze input of claim 1, wherein the first predetermined length of time is a dynamic value.

15. The method for dismissing information from a display device based on a gaze input of claim 14, wherein the dynamic value is selected based on a gaze history of the user.

16. The method for dismissing information from a display device based on a gaze input of claim 14, wherein the dynamic value is selected based on an action of the user preceding the first predetermined length of time.

17. The method for dismissing information from a display device based on a gaze input of claim 1, wherein the first predetermined length is a dynamic value defined by at least:
monitoring how long the user glances at objects displayed by the application on the display device; and
reducing the dynamic value from a first value to a second value based on the monitoring indicating that the user glances at objects for less than the second value.

18. The method for dismissing information from a display device based on a gaze input of claim 1, wherein the first predetermined length is a dynamic value defined by at least:
determining that the user has been using a second application for a period of time prior to the object being displayed by the application; and
reducing the dynamic value based on the determining that the user has been using the second application for the period of time.

19. The method for dismissing information from a display device based on a gaze input of claim 1, wherein causing the object to not be displayed on the display device comprises:
subsequent to the first predetermined length of time, determining that the gaze location remained outside the area for a second predetermined length of time; and
subsequent to the second predetermined length of time, dismissing the object from the display device.

20. The method for dismissing information from a display device based on a gaze input of claim 19, wherein the second predetermined length of time is a dynamic value defined by at least:
determining a period of time subsequent to the first predetermined length of time and during which the gaze location remained within the area; and
adjusting the dynamic value based on the period of time.

21. A system for dismissing information from a display device based on a gaze input, wherein the system comprises:
a display device;
an eye tracking device; and
one or more processors configured to at least:
determine that an object has been displayed on the display device by an application, the object indicated as available for dismissal based on a display size of the object on the display device and by using a flag, wherein a value of the flag is set based on the display size of the object being smaller than a full screen size, and wherein the area includes a display area of the object and an additional area around the display area, and wherein an amount of the additional area is based on the display size of the object;
determine an area on the display device associated with the object, the area containing the object;
determine, with the eye tracking device, a gaze location of a user on the area on the display device; and
cause the object to not be displayed on the display device, based at least in part on:
the gaze location being located within the area for at least a first predetermined length of time, the first predetermined length of time defined as a first amount of time of gaze within the area based on the text string of the object being displayed on the display device and changes to a second amount of time of gaze within the area when an image is displayed instead of the text string; and
the gaze location not being located within the area for at least a second predetermined length of time after the first predetermined length of time.

22. A non-transitory machine readable medium having instructions stored thereon for dismissing information from a display device based on a gaze input, wherein the instructions are executable by one or more processors to at least:
determine that an object has been displayed on a display device by an application, the object indicated as available for dismissal based on a display size of the object on the display device and by using a flag, wherein a value of the flag is set based on the display size of the object being smaller than a full screen size, and wherein the area includes a display area of the object and an additional area around the display area, and wherein an amount of the additional area is based on the display size of the object;
determine an area on the display device associated with the object, the area containing the object;
determine a gaze location of a user on the area on the display device;
cause the object to not be displayed on the display device, based at least in part on the gaze location being located within the area for at least a first predetermined length of time, wherein the first predetermined length of time is a dynamic value and is defined as a first amount of time of gaze within the area based on the text string of the object being displayed on the display device and changes to a second amount of time of gaze within the area when an image is displayed instead of the text string; and
selecting the dynamic value based at least in part on:
a gaze history of the user; or
an action of the user preceding the first predetermined length of time.

* * * * *